United States Patent
Mehl et al.

(10) Patent No.: US 10,962,988 B2
(45) Date of Patent: Mar. 30, 2021

(54) METHOD OF DETERMINING THE CENTER OF GRAVITY OF AN AIRCRAFT AND A METHOD OF FUEL/LOAD MANAGEMENT BASED THEREON

(71) Applicant: Bell Helicopter Textron Inc., Fort Worth, TX (US)

(72) Inventors: Peter Carlton Mehl, Fort Worth, TX (US); Terrence Patrick Brehn, Hurst, TX (US); Robert Blyth, Fort Worth, TX (US); Brady G. Atkins, Euless, TX (US)

(73) Assignee: Textron Innovations Inc., Providence, RI (US)

( * ) Notice: Subject to any disclaimer, the term of this patent is extended or adjusted under 35 U.S.C. 154(b) by 155 days.

(21) Appl. No.: 16/177,431

(22) Filed: Nov. 1, 2018

(65) Prior Publication Data

US 2020/0142431 A1     May 7, 2020

(51) Int. Cl.
    *G05D 1/08*     (2006.01)
    *B64D 37/00*     (2006.01)
    *G01M 1/12*     (2006.01)
    *B64C 29/00*     (2006.01)

(52) U.S. Cl.
    CPC .......... *G05D 1/0816* (2013.01); *B64D 37/00* (2013.01); *G01M 1/127* (2013.01); *B64C 29/0033* (2013.01); *G05D 1/0858* (2013.01)

(58) Field of Classification Search
    CPC .... G05D 1/0816; G05D 1/0858; B64D 37/00; G01M 1/127; B64C 29/0033; B64C 27/28; B64C 17/10; Y10T 137/4673
See application file for complete search history.

(56) References Cited

U.S. PATENT DOCUMENTS

| | | | | |
|---|---|---|---|---|
| 4,622,639 | A | * | 11/1986 | Adelson ............... G05D 1/0816 701/124 |
| 5,034,896 | A | | 7/1991 | Orgun et al. |
| 5,571,953 | A | | 11/1996 | Wu |
| 9,464,958 | B2 | | 10/2016 | Shue |
| 2010/0044515 | A1 | * | 2/2010 | Neto ..................... G01M 1/127 244/135 C |
| 2016/0209290 | A1 | * | 7/2016 | Shue ..................... G01M 1/127 |

* cited by examiner

*Primary Examiner* — Anne Marie Antonucci
*Assistant Examiner* — Andrew J Cromer
(74) *Attorney, Agent, or Firm* — Lightfoot & Alford PLLC

(57) ABSTRACT

A method of determining a center of gravity of an aircraft in flight by comparing actual control surface actuator displacements to expected control surface actuator displacements. And a method of fuel/load management based on an offset of the center of gravity from a preferred center of gravity and a handling qualities factor.

18 Claims, 5 Drawing Sheets

METHOD OF DETERMINING THE CENTER OF GRAVITY OF AN AIRCRAFT AND A METHOD OF FUEL/LOAD MANAGEMENT BASED THEREON

BACKGROUND

The center of gravity of an aircraft may change during flight. The changes to the center of gravity may be gradual, for example, fuel consumption during flight may slowly alter the center of gravity of the aircraft. Alternatively, the center of gravity of the aircraft may change rapidly, for example, when air-dropping cargo or discharging large munitions. As the center of gravity deviates from the optimal location, the pilot, or the flight control system, must deploy flight control surfaces to maintain the desired attitude. In addition, if the center of gravity deviates beyond the center of gravity envelope for the aircraft, the aircraft can become unflyable.

The dilemma of the changing center of gravity has been managed by making pre-flight calculations that predict the changing center of gravity by calculating burn rates and scheduling a predetermined tank burn order. This method is sometimes augmented with fuel tank sensors for high fidelity mapping of fuel levels to monitor burn rates and loads. Another method of determining the center of gravity during flight involves utilizing six or more accelerometers to determine aircraft lean. Other methods for determining the center of gravity while in flight are disclosed in U.S. Pat. Nos. 9,464,958; 5,571,953; and 5,034,896; all of which are incorporated herein by reference in their entireties.

DETAILED DESCRIPTION

While the making and using of various embodiments of this disclosure are discussed in detail below, it should be appreciated that this disclosure provides many applicable inventive concepts, which can be embodied in a wide variety of specific contexts. The specific embodiments discussed herein are merely illustrative and do not limit the scope of this disclosure. In the interest of clarity, not all features of an actual implementation may be described in this disclosure. It will of course be appreciated that in the development of any such actual embodiment, numerous implementation-specific decisions must be made to achieve the developer's specific goals, such as compliance with system-related and business-related constraints, which will vary from one implementation to another.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges a method of determining a center of gravity of an aircraft while in flight and a method of fuel/load management designed to improve desired aircraft handling qualities. The method of determining the center of gravity of the aircraft provides axial offset about all three axes without the need for additional sensors beyond those already inherent in a flight control system. The method of fuel/load management allows for dynamic scheduling of fuel burn and/or use/airdropping of other consumable loads such as munitions or supplies, to account for rapid or gradual changes of the center of gravity of the aircraft, as well as changes in the desired aircraft handling qualities of the aircraft.

Figure 1:
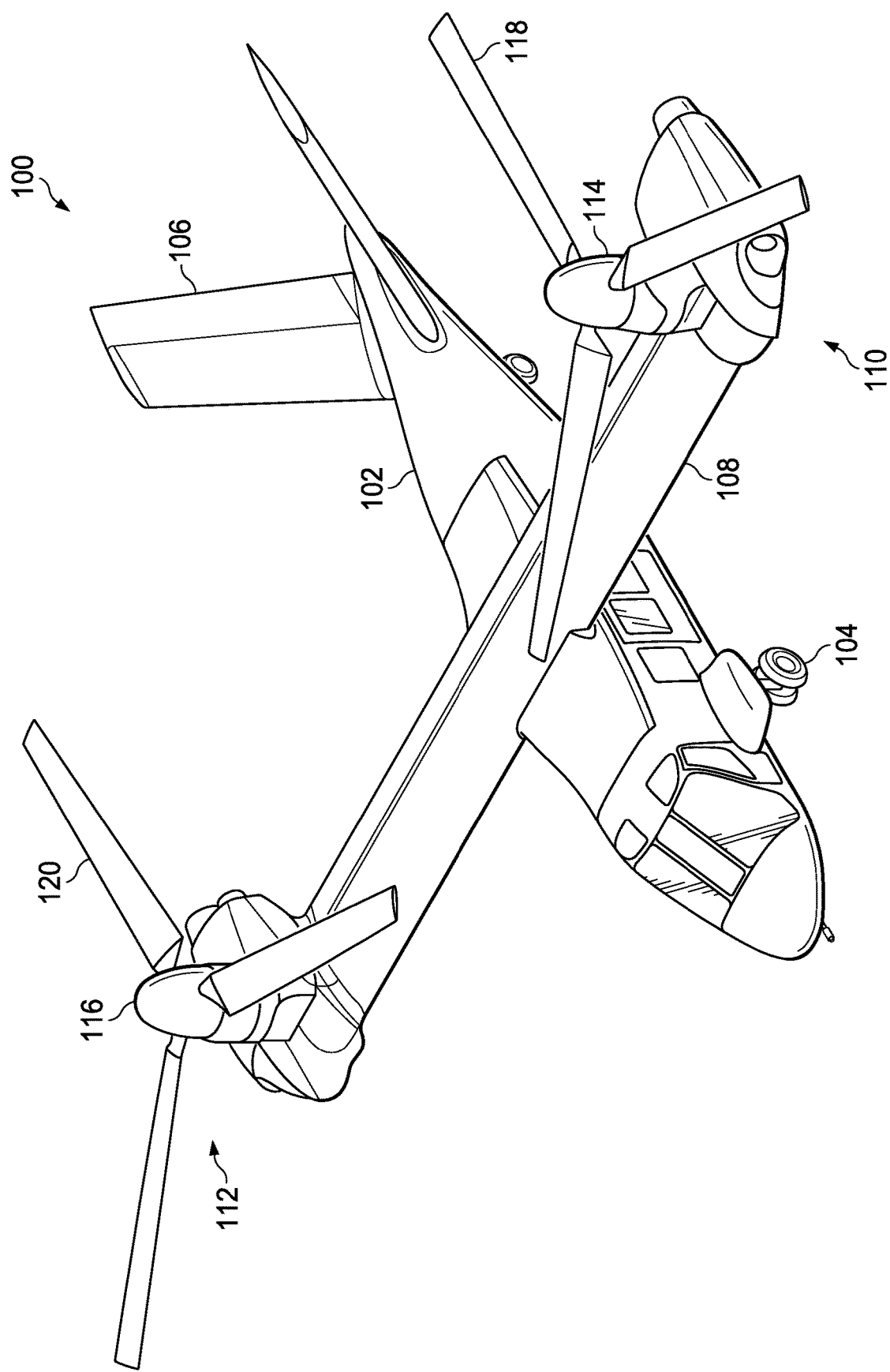
FIG. 1 is an oblique view of a tiltrotor aircraft, according to this disclosure, showing the tiltrotor aircraft in a helicopter mode of operation.
Figure 2:
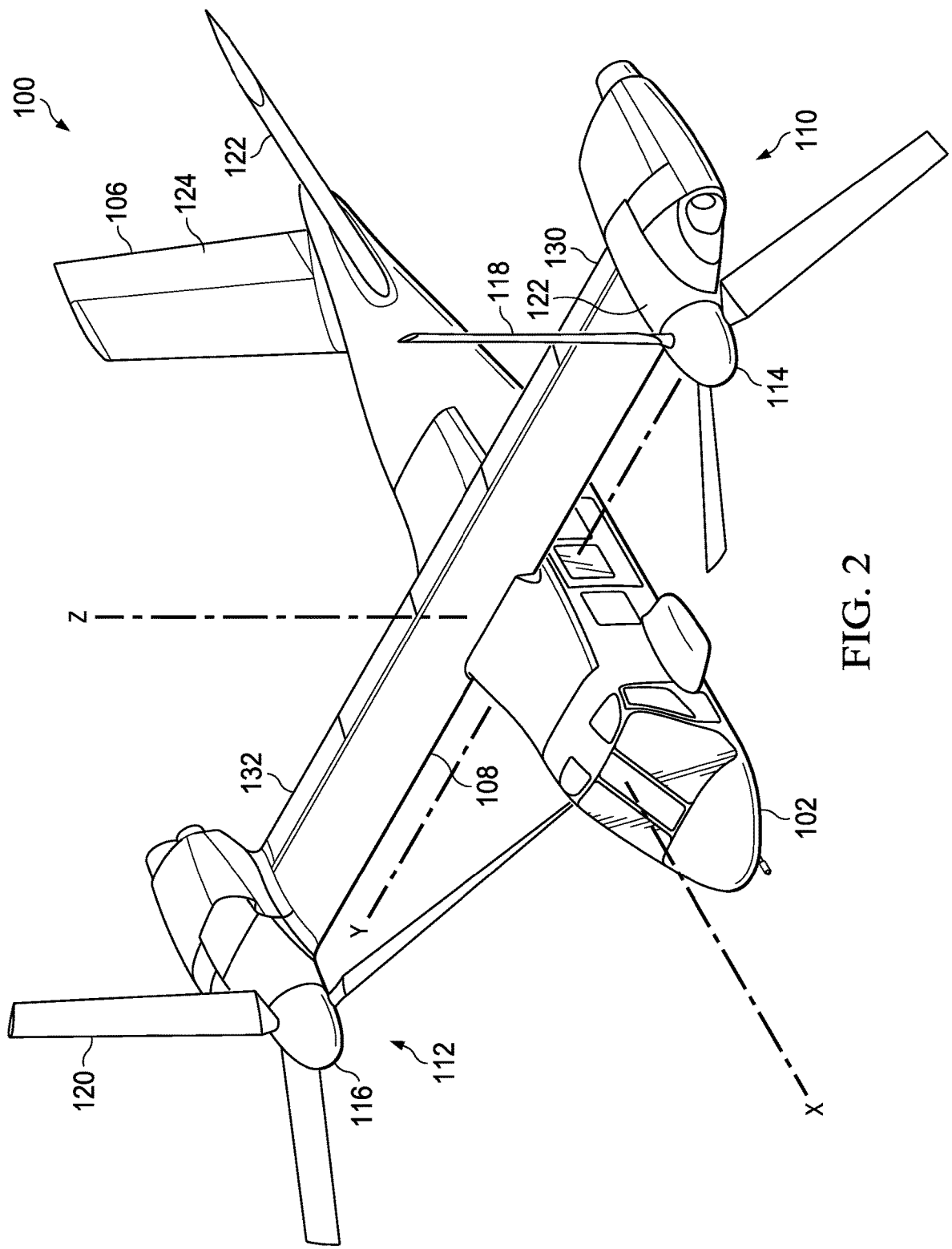
FIG. 2 is an oblique view of the tiltrotor aircraft of FIG. 1 showing the tiltrotor aircraft in an airplane mode of operation.

Referring to FIGS. 1 and 2, a tiltrotor aircraft 100 is illustrated. Tiltrotor aircraft 100 includes a fuselage 102, a landing gear 104, a tail member 106, a wing 108, a propulsion system 110, and a propulsion system 112. Each propulsion system 110 and 112 includes an engine and a rotatable proprotor 114 and 116, respectively. Each rotatable proprotor 114 and 116 has a plurality of rotor blades 118 and 120, respectively, associated therewith. The position of proprotors 114 and 116, as well as the pitch of rotor blades 118 and 120, can be selectively controlled to control direction, thrust, and lift of tiltrotor aircraft 100.

FIG. 1 illustrates tiltrotor aircraft 100 in a helicopter mode, in which proprotors 114 and 116 are positioned substantially vertical to provide a lifting thrust. FIG. 2 illustrates tiltrotor aircraft 100 in an airplane mode, in which proprotors 114 and 116 are positioned substantially horizontal to provide a forward thrust in which a lifting force is supplied by wing 108. It should be appreciated that tiltrotor aircraft 100 can be operated such that proprotors 114 and 116 are selectively positioned between airplane mode and helicopter mode, which can be referred to as a conversion mode. Moreover, while this disclosure describes the aforementioned methods in conjunction with tiltrotor aircraft 100, it should be understood that the methods disclosed herein may be used on any type of aircraft.

Still referring to FIG. 2, tiltrotor aircraft 100 includes a plurality of flight control surfaces including: a ruddervator 122 and a ruddervator 124 for primarily controlling both the pitch about transverse axis Y and the yaw about vertical axis Z; and an aileron 130 and an aileron 132 for primarily controlling the roll about longitudinal axis X. An intersection point (not shown) of transverse axis Y, vertical axis Z, and longitudinal axis X represents a preferred center of gravity of tiltrotor aircraft 100 while in airplane mode. While tiltrotor aircraft 100 burns fuel, expends munitions, and/or airdrops supplies, the actual center of gravity thereof deviates from the preferred center of gravity at the intersection of transverse axis Y, vertical axis Z, and longitudinal axis X. As the actual center of gravity deviates from the preferred center of gravity, ruddervators 122 and 124 and ailerons 130 and 132 must be deployed to maintain a desired orientation of tiltrotor aircraft 100. Deployment of ruddervators 122 and 124 and ailerons 130 and 132 is affected by actuators (not shown) that precisely control the amount of deployment. As discussed in detail below, the positions of the actuators may be used to determine an offset of the actual center of gravity from the preferred center of gravity.

Figure 3:
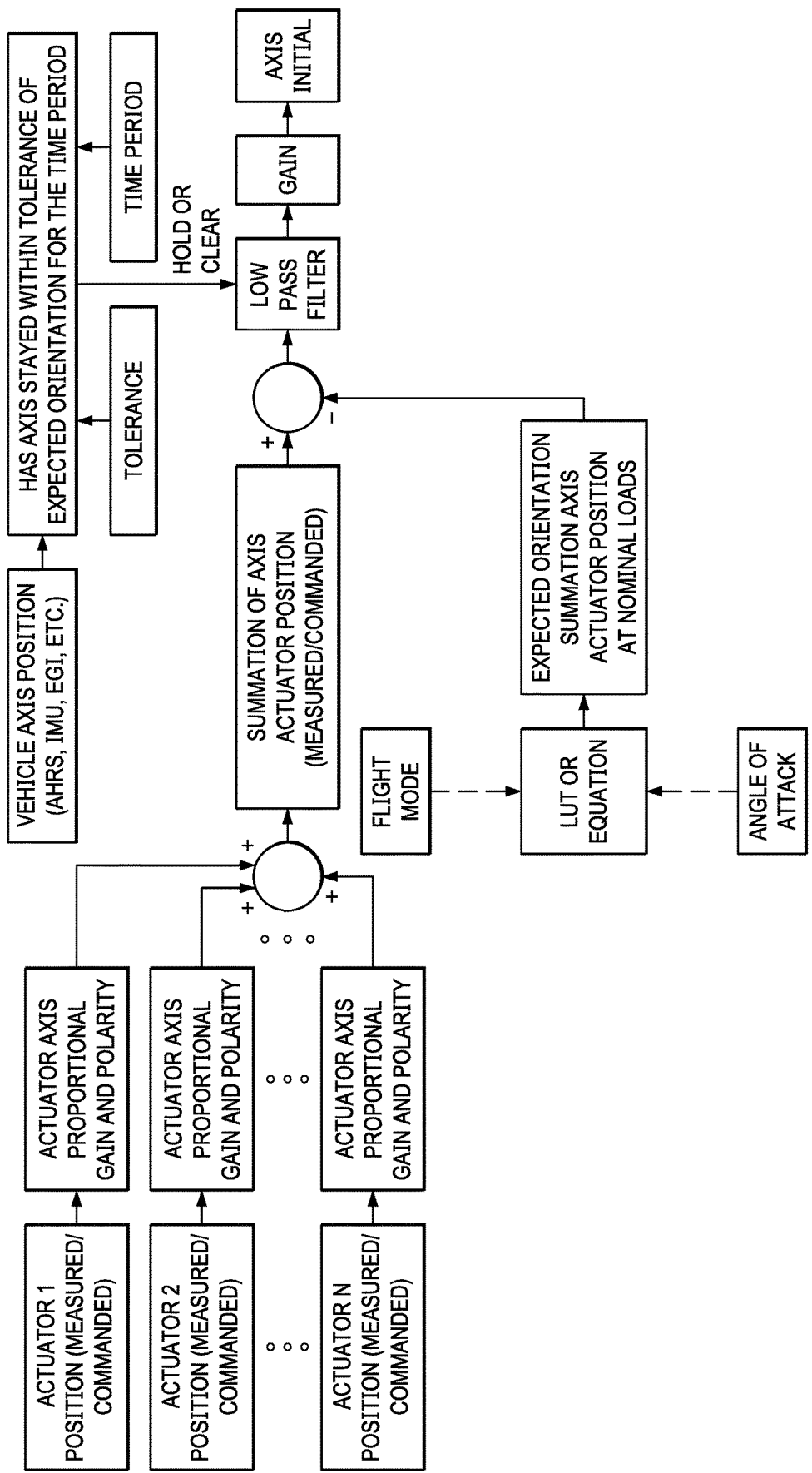
FIG. 3 is a diagram showing a method of determining a center of gravity of an aircraft about an axis while the aircraft is in flight.

The method of determining the center of gravity of an aircraft while in flight generally includes determining the forces exerted by deployment of the flight control surfaces to maintain a specific attitude, based on the positions of their associated actuators, and comparing those forces with the expected forces required to maintain the same attitude if the center of gravity were located at a preferred location. The method may be practiced utilizing already existing equipment provided on most aircraft. A specific example of this method for one of axes X, Y, and Z is shown in FIG. 3, and described with reference to tiltrotor aircraft 100 of FIGS. 1 and 2.

While tiltrotor aircraft 100 is flown on a straight and level flight path, or other steady, known flight orientation, during a predetermined time period, positions of the actuators affecting the positions of ruddervators 122 and 124 and ailerons 130 and 132 are determined. The positions of the actuators may be determined by using the commanded positions of the actuators, or preferably, using the measured feedback positions thereof. The effect of these actuator positions is then determined for each of axes X, Y, and Z. This is accomplished by correlating each of the actuator positions to a rotational force produced about each of the axes X, Y, and Z. For example, deploying ruddervator 122 in the vertical/right direction will cause a clockwise rotational force about axis Z, when viewed from above, a clockwise rotational force about axis Y, when viewed from the left, and a clockwise rotational force about axis X, when viewed from the front. One possible method of determining these rotational forces may be a function of the position of the actuator deploying ruddervator 122 (P), an effectiveness rating of ruddervator 122 (A), and a distance of ruddervator 122 from each of axes X, Y, and Z (D). Such that the rotation force for the actuator deploying ruddervator 122 may equal $(A_{122}*P_{122}/D_{122})$. As such, the position of each of the actuators affecting the positions of ruddervators 122 and 124 and ailerons 130 and 132 may be correlated to a rotational force about each of axes X, Y, and Z.

For each of axes X, Y, and Z, an actual summation of the rotational forces about that axis is calculated. For example, the actual summation of the rotational forces about axis X may be calculated by adding each of the correlated rotational forces for the actuator positions associated with each of ruddervators 122 and 124 and ailerons 130 and 132. For example, the actual summation of the rotational forces may equal $(A_{122}*P_{122}/D_{122})+(A_{124}*P_{124}/D_{124})+(A_{130}*P_{130}/D_{130})+(A_{130}*P_{130}/D_{130})$. It should be understood that the actual summation need not be exact; it may be an approximation.

While tiltrotor aircraft 100 is flown on the straight and level flight path during the time period, a flight mode, an angle of attack, air conditions (altitude, air pressure, temperature, humidity, etc.), and known payloads are determined. Accounting for these variables via lookup tables and/or equations, an expected summation of rotational forces about each of axes X, Y, and Z is determined. That is, based on the variables, a prediction of what the actuator positions, and the resulting rotational forces about each of axes X, Y, and Z, should be to maintain the flight path during the time period, assuming a preferred center of gravity at the intersection of axes X, Y, and Z. The expected summation of the rotational forces may also account for changes in desired flight optimization characteristics, such as, maximum velocity, fuel economy, maximum load capacity, maximum distance, etc. The difference between the actual summation of the rotational forces about each of axes X, Y, and Z and the expected summation of the rotational forces about each of axes X, Y, and Z is determined by subtracting the expected summation from the actual summation. Each of these differences is then correlated to a center of gravity offset from each of the axes X, Y, and Z. Each of the center of gravity offsets from its respective axis X, Y, or Z is then passed to a low pass filter.

In addition, while tiltrotor aircraft 100 is flown on the straight and level flight path during the time period, the orientation of tiltrotor aircraft 100 relative to each of axes X, Y, and Z is determined, using, for example, an attitude and heading reference system, inertial measurement units, an embedded GPS inertial system, an air data system, and/or an air data altitude heading reference system, etc. Depending on whether these orientations relative to axes X, Y, and Z are verified to have remained within a predetermined tolerance for the duration of the time period, the determined center of gravity offsets from that time period may be zeroed or passed through the low pass filter. This will prevent including skewed data caused during maneuvers from affecting the center of gravity determination. All of the preceding steps are repeated over successive time periods so that the center of gravity of tiltrotor aircraft 100 is being continuously monitored and updated. Accordingly, rather than zeroing the output from the low pass filter, a last known value passing through may be retransmitted.

Figure 4:
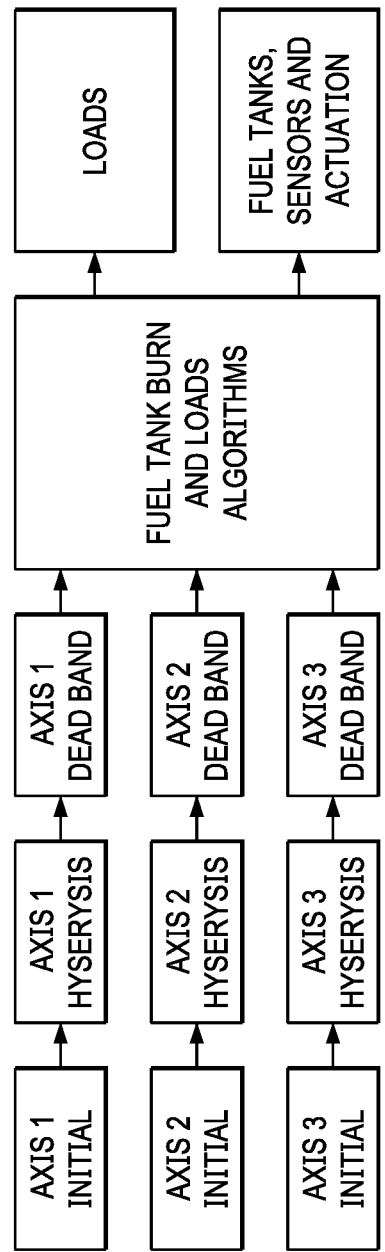
FIG. 4 is a diagram showing a method of utilizing a center of gravity determination about three axes to affect fuel/load management decisions.

As shown in FIG. 4, the initial center of gravity offset (AXIS INITIAL) for each axis X, Y, and Z then goes through a hysteresis and/or a dead band to verify actual center of gravity offsets from the preferred center of gravity. The center of gravity offsets may then be utilized by fuel burn and/or load management algorithms to make fuel burn and/or load management decisions based on the actual center of gravity during flight. Because the process is iterative over successive time periods, it may take a longer than desired amount of time to update the actual center of gravity in response to a large change in payload. While the process will eventually account for the large change in payload, it may be advantageous for the process to include the ability to make a predicted stepwise change to the center of gravity determination based on an expected change in the center of gravity due to the large payload modification. Then, allowing the process to continue to incrementally adjust the center of gravity determination from the stepwise adjustment. While the example describes determining the center of gravity offset from all three axes X, Y, and Z, it should be understood that, in certain applications, the center of gravity offset from only one or two axes may be sufficient to make fuel/load management decisions. Accordingly, the method may be utilized to determine a center of gravity offset from one, two, or all three of axes X, Y, and Z.

The method of dynamic fuel/load management includes accounting for a center of gravity offset from a preferred center of gravity, as well as accounting for changes in the desired handling qualities of the aircraft. The method may be practiced utilizing already existing equipment provided on most aircraft. A specific example of this method is shown in FIG. 5 and described with reference to tiltrotor aircraft 100 of FIGS. 1 and 2.

Figure 5:
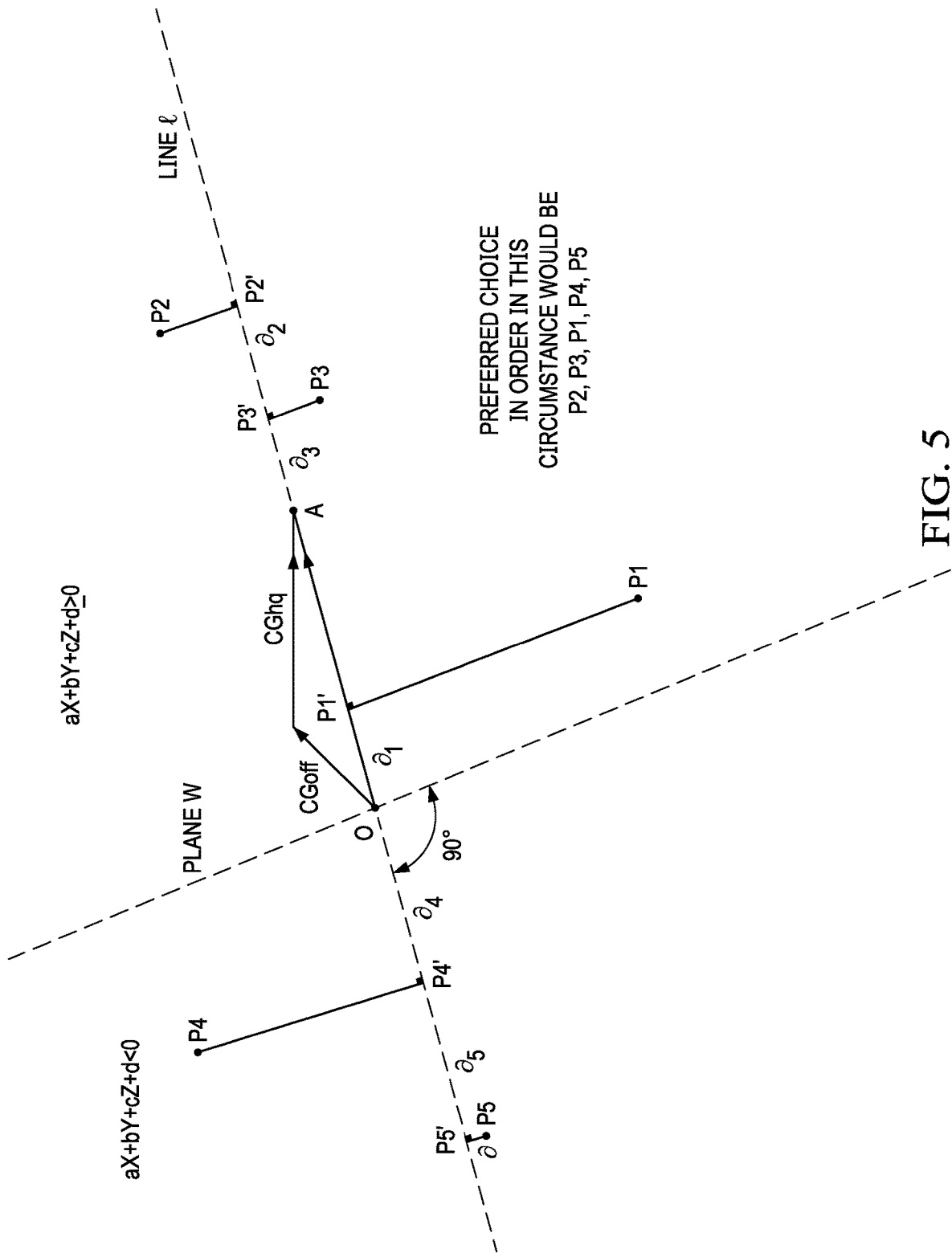
FIG. 5 is a diagram showing a method of fuel management.

The example of the method of dynamic fuel/load management shown in FIG. 5 includes determining a center of gravity offset $CG_{off}$ from a preferred center of gravity $O=<r,s,t>$ located at the intersection of axes X, Y, and Z of tiltrotor aircraft 100. Center of gravity offset $CG_{off}$ may be determined utilizing the above described method or any other means of determining the center of gravity of tiltrotor aircraft 100 while in flight. Next, a handling qualities factor $CG_{hq}$ is determined based on a controllable envelope or the desired handling characteristics of tiltrotor aircraft 100 which delineates the importance of the various axes X, Y, and Z with respect to one another. A vector A is then defined as a function of center of gravity offset $CG_{off}$ and handling qualities factor $CG_{hq}$, wherein the function may be the Hadamard Product of $CG_{off}$ and $CG_{hq}$: A=(CGoff∘CGhq)=<a,b,c>. Then, defining a plane W from preferred center of gravity O and vector A such that: aX+bY+cZ−(ar+bs+ct)=0, wherein d=−(ar+bs+ct); requiring plane W to include preferred center of gravity O and be orthonormal to vector A. And determining whether vector A meets Condition 1 → aX+bY+cZ+d≥0 or Condition 2 → aX+bY+cZ+d<0. A normalized vector φ of plane W being defined as φ=(A−O)/‖(A−O)‖.

Next, a list of available consumable loads is prepared, wherein the consumable loads may be, for example, fuel in different tanks, different locations of munitions, different locations of droppable supplies, or any combination thereof. For the purposes of this example, the consumable loads will be considered fuel in five different tanks. And the method will be utilized to determine a preferred burn order, as opposed to a preferred firing order, drop order, etc. Centers of gravity P1-P5 of the available fuel tanks are then determined. Centers of gravity P1-P5 may be estimated or precise. Accordingly, center of gravity P may be defined in a number of ways, including, but not limited to: P(X,Y,Z) wherein P is the orthogonal center point of the fuel tank during flight, and height position Z is approximated as $Z=Z_{empty}+0.5*(Z_{full}-Z_{empty})$; P(X,Y,Z(f)), wherein P is the orthogonal center point of the fuel tank during flight, and height position Z in reference to the coordinate axes is dependent upon a fuel level f, wherein f is dependent upon fuel burn from the fuel tank, possibly tracked by flight profile/stage, and time of fuel burn; or P(X(f),Y(f),Z(f)), wherein P is the orthogonal center point of the fuel tank during flight, and positions X, Y, and Z in reference to the coordinate axes are dependent upon fuel level f, wherein f is dependent upon fuel burn from the fuel tank, possibly tracked by flight profile/stage, and time of fuel burn. Alternatively, fuel level f may be determined by a fuel gauge in the fuel tank.

The list of available fuel tanks is then separated into a List 1 and a List 2 depending upon which side of plane W centers of gravity P1-P5 are located, wherein aX+bY+cZ+d≥0 → List 1, as shown in FIG. 5, this includes centers of gravity P1, P2, and P5 which are on the same side plane W as vector A, and wherein aX+bY+cZ+d<0 → List 2 which includes centers of gravity P4 and P5 which are on the opposite side of plane W from vector A.

After determining centers of gravity P1-P5, their distances from plane W along a direction parallel to vector A may be defined by ∂(P',O)=‖φ*(P●φ)−O‖, wherein ∂ is the distance between a point P' and preferred center of gravity O along a line lextending from unit vector φ. With the distances ∂ known, a prioritized list of the available fuel tanks can be created based on the following criteria: when in Condition 1, the fuel tanks on List 1 having the greatest distance ∂ have the highest priority followed by the fuel tanks on List 2 having the shortest distance ∂; when in Condition 2, the fuel tanks on List 2 having the greatest distance ∂ have the highest priority followed by the fuel tanks on List 1 having the shortest distance ∂. In the example shown in FIG. 5, Condition 1 is satisfied. Accordingly, the order of the prioritized list is P2, P3, and P1 from List 1, because they have the greatest distances $∂_2$, $∂_3$, and $∂_1$, respectively, followed by P4 and P5 from List 2, because they have the shortest distances $∂_4$ and $∂_5$, respectively. If the currently utilized fuel tank is other than the prioritized fuel tank, tiltrotor aircraft 100 will switch from the currently utilized fuel tank to the prioritized fuel tank if a superiority of the prioritized fuel tank is greater than or equal to a specific hysteresis amount.

While the example provides for prioritizing fuel tanks for burning, the method may be used to rearrange payload distribution, for example, by pumping fuel from one fuel tank to another. For example, in the example in FIG. 5, it may be decided to pump fuel from prioritized fuel tank P2 to lowest priority fuel tank P5 in order to more rapidly improve the desired handling qualities.

While the methods discussed above are described in relation to a tiltrotor aircraft, it should be understood that the same methods may be applied to any aircraft. Moreover, while the methods discussed above are described in relation to control surfaces normally associated with fixed-wing aircraft, it should be understood that the same principles may be applied to the actuators affecting the cyclic and collective control of main rotors and tail rotors of helicopters, as well as the proprotors of tiltrotor aircraft.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A method of determining a center of gravity of an aircraft, comprising:
    flying the aircraft for a time period;
    detecting an orientation of the aircraft relative to a first axis;
    verifying the orientation of the aircraft relative to the first axis has stayed within a tolerance during the time period;
    determining a center of gravity offset from the first axis, comprising:
        determining positions of a plurality of actuators affecting positions of a respective plurality of control surfaces of the aircraft;
        correlating the positions of the plurality of actuators to rotational forces generated by the plurality of control surfaces about the first axis;
        calculating an actual summation of the rotational forces about the first axis;
        determining an expected summation of the rotational forces about the first axis based on a preferred center of gravity being coincident with the first axis;
        determining a difference between the actual summation of the rotational forces about the first axis and the expected summation of the rotational forces about the first axis;
        correlating the difference between the actual summation of the rotational forces about the first axis and the expected summation of the rotational forces about the first axis with the center of gravity offset from the first axis;
        making inflight load management and/or inflight fuel burn decisions based on the center of gravity offset from the first axis and the center of gravity offset from the second axis; and
        while in flight, discontinuing consumption from a first fuel source and initiating consumption of from a second fuel source in response to the difference between the actual summation of the rotational forces about the first axis and the expected summation of the rotational forces about the first axis.

2. The method of claim 1, further comprising:
    detecting an orientation of the aircraft relative to a second axis;
    verifying the orientation of the aircraft relative to the second axis has stayed within the tolerance for the time period;
    determining a center of gravity offset from the second axis, comprising:
        correlating the positions of the plurality of actuators to rotational forces generated by the plurality of control surfaces about the second axis;
        calculating an actual summation of the rotational forces about the second axis;
        determining an expected summation of the rotational forces about the second axis based on the preferred center of gravity being coincident with the second axis;
        determining a difference between the actual summation of the rotational forces about the second axis and the expected summation of the rotational forces about the second axis; and
        correlating the difference between the actual summation of the rotational forces about the second axis and the expected summation of the rotational forces about the second axis with the center of gravity offset from the second axis.

3. The method of claim 2, wherein the method repeats over successive time periods.

4. The method of claim 3, further comprising:
    determining a flight mode of the aircraft, an angle of attack of the aircraft, and air conditions during the time periods; and
    accounting for the flight mode of the aircraft, the angle of attack of the aircraft, and the air conditions during each of the time periods when determining the expected summations of the rotational forces about the first axis and the second axis.

5. The method of claim 1, wherein the determining the positions of the plurality of actuators includes either receiving measured position values or receiving commanded position values.

6. The method of claim 5, further comprising:
    detecting an orientation of the aircraft relative to a third axis;
    verifying the orientation of the aircraft relative to the third axis has stayed within the tolerance for the time period;
    determining a center of gravity offset from the third axis, comprising:
        correlating the positions of the plurality of actuators to rotational forces generated by the plurality of control surfaces about the third axis;
        calculating an actual summation of the rotational forces about the third axis;
        determining an expected summation of the rotational forces about the third axis based on the preferred center of gravity being coincident with the third axis;
        determining a difference between the actual summation of the rotational forces about the third axis and the expected summation of the rotational forces about the third axis; and
        correlating the difference between the actual summation of the rotational forces about the third axis and the expected summation of the rotational forces about the third axis with the center of gravity offset from the third axis.

7. The method of claim 5, wherein the correlating the positions of the plurality of actuators to the rotational forces generated by the plurality of control surfaces about the first axis is a function of the position of each of the plurality of actuators, an effectiveness rating of the respective control surface, and a distance between the respective control surface and the first axis.

8. A method of fuel management of an aircraft, comprising:
    determining a center of gravity offset relative to a preferred center of gravity of the aircraft during a flight;
    determining a handling qualities factor;
    determining a vector as a function of the center of gravity offset and the handling qualities factor;
    defining a plane including the preferred center of gravity of the aircraft and being orthonormal to the vector;
    determining a center of gravity of each of a plurality of fuel tanks;

determining distances from the plane to the center of gravity of each of the plurality of fuel tanks in a direction parallel to a direction of the vector;

prioritizing use of the plurality of fuel tanks from a largest distance from the plane on a same side of the plane as the vector to a largest distance from the plane on an opposite side of the plane as the vector; and while in flight, switching from a currently used fuel tank to a prioritized fuel tank when a superiority of the prioritized fuel tank is greater than or equal to a specific hysteresis amount.

9. The method of claim 8, wherein the determining the center of gravity offset repeats during the flight.

10. The method of claim 9, maintaining a list of available fuel tanks by eliminating empty fuel tanks, and wherein the prioritizing only includes the fuel tanks of the list of the available fuel tanks.

11. The method of claim 8, wherein the handling qualities factor may be modified to optimize different flight characteristics during the flight.

12. The method of claim 11, wherein the vector is a Hadamard Product of the center of gravity offset and the handling qualities factor.

13. The method of claim 12, wherein the determining the center of gravity of each of the plurality of fuel tanks includes utilizing either predetermined approximate locations of the centers of gravity of the plurality of fuel tanks or recalculating locations of the centers of gravity of the plurality of fuel tanks during the flight based on fuel levels provided by fuel gauges or based on estimated fuel levels determined by a flight profile and a time of burn.

14. A method of load management of an aircraft, comprising:

determining a center of gravity offset relative to a preferred center of gravity of the aircraft during a flight;

determining a handling qualities factor;

determining a vector as a function of the center of gravity offset and the handling qualities factor;

defining a plane including the preferred center of gravity of the aircraft and being orthonormal to the vector;

determining a center of gravity of each of a plurality of consumable loads;

determining distances from the plane to the center of gravity of each of the plurality of consumable loads in a direction parallel to a direction of the vector;

prioritizing use of the plurality of consumable loads from a largest distance from the plane on a same side of the plane as the vector to a largest distance from the plane on an opposite side of the plane as the vector; and while in flight, discontinuing use of a first consumable load and initiating use of a second consumable load in response to the prioritizing.

15. The method of claim 14, wherein the plurality of consumable loads includes at least one of munitions, fuel, or supplies.

16. The method of claim 15, wherein the determining the center of gravity offset of the aircraft during the flight comprises:

detecting an orientation of the aircraft relative to a first axis, a second axis, and a third axis during a time period;

verifying the orientation of the aircraft relative to the first, second, and third axes has stayed within a tolerance during the time period;

determining a center of gravity offset from the first axis, comprising:

determining positions of a plurality of actuators affecting positions of a respective plurality of control surfaces of the aircraft;

correlating the positions of the plurality of actuators to rotational forces generated by the plurality of control surfaces about the first axis;

calculating an actual summation of the rotational forces about the first axis;

determining an expected summation of the rotational forces about the first axis based on the preferred center of gravity being coincident with the first axis;

determining a difference between the actual summation of the rotational forces about the first axis and the expected summation of the rotational forces about the first axis; and correlating the difference between the actual summation of the rotational forces about the first axis and the expected summation of the rotational forces about the first axis with the center of gravity offset from the first axis; and determining a center of gravity offset from the second axis, comprising:

correlating the positions of the plurality of actuators to rotational forces generated by the plurality of control surfaces about the second axis;

calculating an actual summation of the rotational forces about the second axis;

determining an expected summation of the rotational forces about the second axis based on the preferred center of gravity being coincident with the second axis;

determining a difference between the actual summation of the rotational forces about the second axis and the expected summation of the rotational forces about the second axis; and correlating the difference between the actual summation of the rotational forces about the second axis and the expected summation of the rotational forces about the second axis with the center of gravity offset from the second axis;

determining a center of gravity offset from the third axis, comprising:

correlating the positions of the plurality of actuators to rotational forces generated by the plurality of control surfaces about the third axis;

calculating an actual summation of the rotational forces about the third axis;

determining an expected summation of the rotational forces about the third axis based on the preferred center of gravity being coincident with the third axis;

determining a difference between the actual summation of the rotational forces about the third axis and the expected summation of the rotational forces about the third axis; and correlating the difference between the actual summation of the rotational forces about the third axis and the expected summation of the rotational forces about the third axis with the center of gravity offset from the third axis;

wherein the determining the center of gravity offset of the aircraft during the flight repeats over successive time periods.

17. The method of claim 16, further comprising:

determining a flight mode of the aircraft, an angle of attack of the aircraft, and air conditions during the time periods; and accounting for the flight mode of the aircraft, the angle of attack of the aircraft, and the air conditions during each of the time periods when determining the expected summations of the rotational forces about the first, second, and third axes.

18. The method of claim 17, wherein the handling qualities factor may be modified to optimize different flight characteristics during the flight.

\* \* \* \* \*